United States Patent
Kesler et al.

(10) Patent No.: US 9,969,242 B2
(45) Date of Patent: May 15, 2018

(54) CONTAMINANT RESISTANT CHARGE VALVE

(71) Applicant: Hanon Systems, Daejeon (KR)

(72) Inventors: Eric Kesler, Northville, MI (US); Steve White, Pickney, MI (US)

(73) Assignee: HANON SYSTEMS, Daejeon (KR)

( * ) Notice: Subject to any disclaimer, the term of this patent is extended or adjusted under 35 U.S.C. 154(b) by 58 days.

(21) Appl. No.: 15/190,266

(22) Filed: Jun. 23, 2016

(65) Prior Publication Data

US 2017/0368903 A1   Dec. 28, 2017

(51) Int. Cl.
| | |
|---|---|
| *F25B 45/00* | (2006.01) |
| *B60H 1/00* | (2006.01) |
| *F16L 37/38* | (2006.01) |
| *F16L 37/40* | (2006.01) |

(52) U.S. Cl.
CPC ..... *B60H 1/00585* (2013.01); *B60H 1/00485* (2013.01); *F16L 37/38* (2013.01); *F25B 45/00* (2013.01); *F16L 37/40* (2013.01); *F25B 2345/006* (2013.01); *Y10T 137/3786* (2015.04); *Y10T 137/7613* (2015.04); *Y10T 137/7931* (2015.04); *Y10T 137/7933* (2015.04)

(58) Field of Classification Search
CPC ..... F16L 37/38; F16L 37/40; Y10T 137/3786; Y10T 137/7613; Y10T 137/7931; Y10T 137/7933
USPC .......................................................... 62/292
See application file for complete search history.

(56) References Cited

U.S. PATENT DOCUMENTS

| 612,855 | A | * | 10/1898 | Little | F16K 15/20 |
|---|---|---|---|---|---|
| | | | | | 137/234.5 |
| 2,155,124 | A | * | 4/1939 | Gibbons | F16K 15/063 |
| | | | | | 137/533.29 |
| 5,139,049 | A | | 8/1992 | Jensen et al. | |
| 5,653,256 | A | | 8/1997 | Myers et al. | |
| 6,050,295 | A | * | 4/2000 | Meisinger | F16K 15/063 |
| | | | | | 137/541 |
| 6,266,971 | B1 | | 7/2001 | Schroder et al. | |
| 6,354,100 | B1 | | 3/2002 | Spanos et al. | |

(Continued)

FOREIGN PATENT DOCUMENTS

| JP | H07285365 A | 10/1995 |
|---|---|---|
| JP | H08200898 A | 8/1996 |

(Continued)

*Primary Examiner* — Eric Keasel
*Assistant Examiner* — Richard K Durden
(74) *Attorney, Agent, or Firm* — Shumaker, Loop & Kendrick, LLP; James D. Miller

(57) ABSTRACT

A charge valve assembly for an air conditioning system includes a valve housing having a first end, a second end, and an inner surface defining a cavity. A valve core assembly is received in the cavity of the valve housing through the second end of the valve housing. The valve core assembly has a first end, a second end, a flow channel extending from the first end of the valve core assembly to the second end of the valve core assembly, an inner sealing surface, and a pin slideably received in the flow channel between an open position and a closed position. The pin has a primary seal selectively engaging the inner sealing surface of the valve core assembly and closing the flow channel at the second end of the valve core assembly when in the closed position. The pin biases towards the first end of the valve housing.

17 Claims, 7 Drawing Sheets

(56) References Cited

U.S. PATENT DOCUMENTS 6,659,426 B2 12/2003 Schroeder et al.
6,719,003 B2 4/2004 Schroeder et al.
7,114,344 B2 10/2006 Gilbert et al.

FOREIGN PATENT DOCUMENTS

JP        09033143 A  * 2/1997
JP      2000213833 A  * 8/2000
JP      2001248740 A  * 9/2001
KR     19960029017 U    9/1996

* cited by examiner

CONTAMINANT RESISTANT CHARGE VALVE

FIELD OF THE INVENTION

The invention relates to air conditioning systems and more particularly to a contaminant resistant charge valve assembly for an air conditioning system of a motor vehicle.

BACKGROUND OF THE INVENTION

As is commonly known, air conditioning systems in vehicles require charge valves. The charge valves, otherwise known as service valves, are employed in the air conditioning systems for testing, charging, discharging, and evacuating a refrigerant from the refrigeration system. It is desired for the charge valves to militate against leakage of the refrigerant and be readily opened for servicing. However, charge valves are commonly prone to undesired effects such as leakage, rapid deterioration, and/or inefficient operability due to contamination introduced to the charge valves during assembly processes. Typically, these undesired effects are the result of the arrangement of the components of the charge valve, the configuration of threaded portions of the charge valve, and inadequate sealing features.

For example, certain charge valves include a valve housing having an inner surface defining a cavity. A lower end of the valve housing is coupled to an air conditioning system component such as a refrigerant tubing, for example, to provide fluid communication between the air conditioning system and the valve housing. During assembly, a valve core is inserted through the cavity from an upper end of the valve housing opposite the lower end and threadingly engages the inner surface of the valve housing. The valve core includes a seal portion that engages the inner surface of the valve housing to selectively open and close the cavity. The seal portion is often formed at a lower end of the valve core and threads of the valve core are typically formed at an upper end of the valve core or above the seal portion. Disadvantageously, as the valve core threadingly engages the inner surface of the valve housing, contamination resulting from the threading action is formed. For example, the contamination can be burrs or particulates formed or loosened during the threading action. The contamination descends onto or adjacent to the seal portion, compromising a sealing of the cavity and resulting in the undesired effects.

Additionally, a brazing process is commonly used to couple the charge valve to the air conditioning system. However, undesired contamination such as excess flux, particulates, or debris resulting from the brazing process flow through the cavity from the lower end of the valve housing onto or adjacent the seal portion, compromising the sealing of the cavity and resulting in the undesired effects.

Furthermore, in another example, the charge valve may include an adaptor having a flow passage. The adaptor is typically pre-brazed to the air conditioning system component and then coupled to the charge valve to provide fluid communication between the air conditioning system and the charge valve. The adaptor includes internal threads that engage external threads of the valve housing of the charge valve. However, the contaminants from the brazing process flow through the flow passage and onto the internal threads and compromise sealing and engagement of the adaptor to the charge valve, resulting in the undesired effects.

It would therefore be desirable to provide a charge valve having a configuration minimizing the effects of contamination therein, wherein sealing, durability, and efficient operation is maximized.

SUMMARY OF THE INVENTION

In accordance and attuned with the present invention, a charge valve having a configuration minimizing the effects of contamination therein, wherein sealing, durability, and efficient operation is maximized has surprisingly been discovered.

According to an embodiment of the disclosure, a valve core assembly configured to be received in a valve housing of a charge valve assembly for an air conditioning system is disclosed. The valve core assembly including a core housing having a first end, a second end, a flow channel extending therethrough, an inner sealing surface, and a seating surface formed proximate the first end. A pin is slideably received in the flow channel between an open position and a closed position. The pin has a primary seal selectively engaging the inner sealing surface of the valve core assembly and closing the flow channel at the second end of the valve core assembly when in the closed position. The pin biases towards the closed position. External threads are formed on the core housing adjacent the second end.

According to another embodiment of the disclosure, a valve housing configured for a charge valve assembly for an air conditioning system is disclosed. The valve housing including a housing body including a first end, a second end and an inner surface defining a cavity. The cavity extends from the first end to the second end. A first threaded portion is formed on the inner surface and configured to engage a cap of the charge valve assembly. A second threaded portion is formed on the inner surface and configured to engage a valve core assembly of the air conditioning system. A seating surface is formed on the inner surface intermediate the first threaded portion and the second threaded portion.

According to yet another embodiment of the disclosure, a charge valve assembly for an air conditioning system includes a valve housing having a first end, a second end, and an inner surface defining a cavity. A valve core assembly is received in the cavity of the valve housing from the second end of the valve housing. The valve core assembly has a first end, a second end, a flow channel extending therethrough, an inner sealing surface, and a pin slideably received in the flow channel. The pin has a primary seal selectively engaging the inner sealing surface of the valve core assembly and closing the flow channel at the second end of the valve core assembly. The pin biases towards the first end of the valve housing.

BRIEF DESCRIPTION OF THE DRAWINGS

The above, as well as other objects and advantages of the invention, will become readily apparent to those skilled in the art from reading the following detailed description of an embodiment of the invention when considered in the light of the accompanying drawings which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical, except as expressly stated. The terms "upper," "lower," and "above" and "below," and similar derivatives, are used for clarity only in reference to an orientation of a charge valve assembly as shown in FIG. 1.

Figure 1:
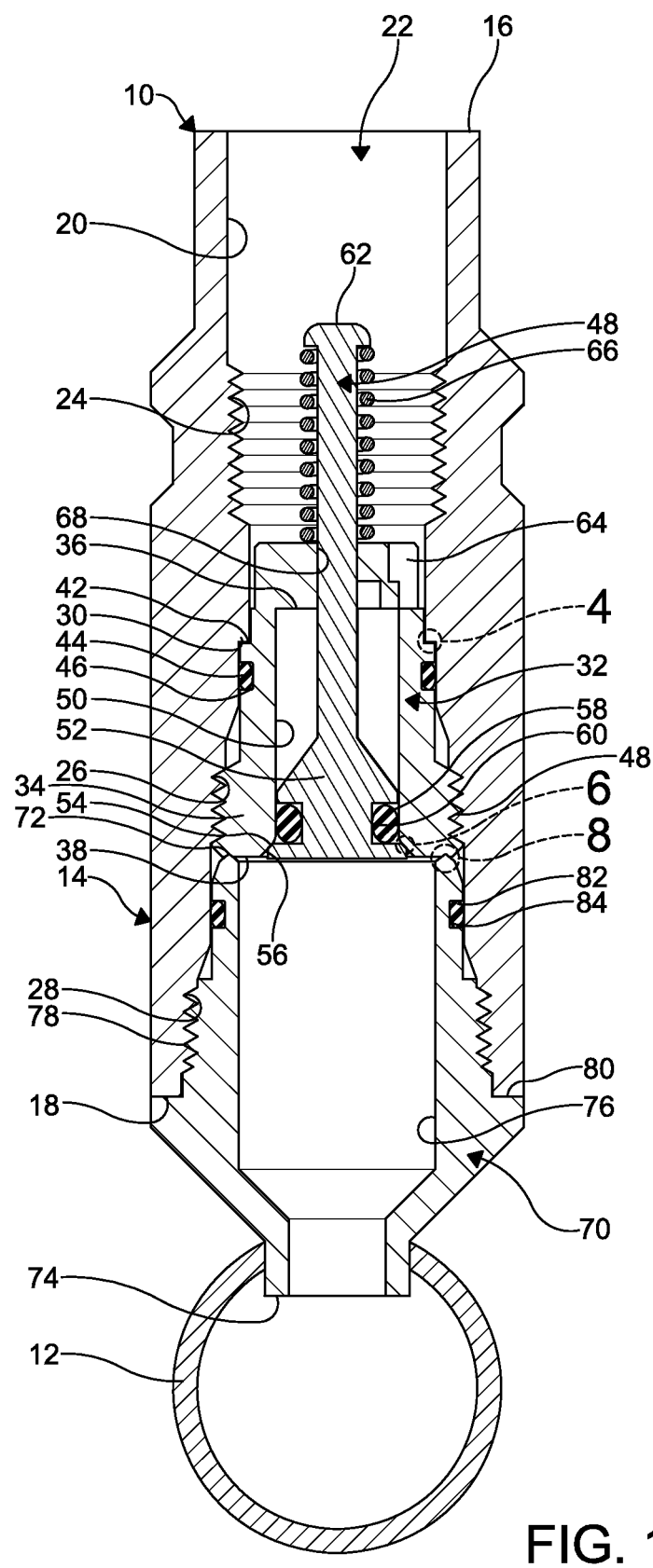
FIG. 1 is a cross-sectional front elevational view of a charge valve assembly coupled to an air conditioning component of an air conditioning system according to an embodiment of the present disclosure, wherein a pin of the charge valve assembly is in a closed position.
Figure 2:
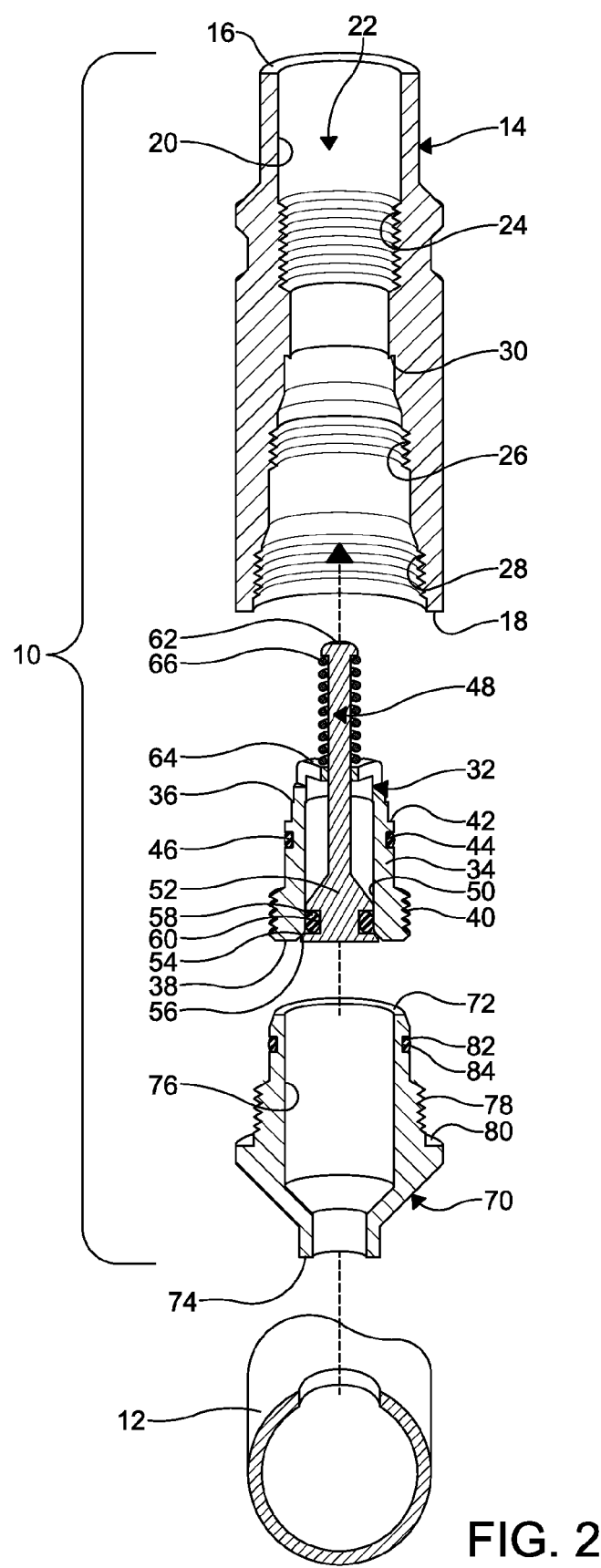
FIG. 2 is a partially exploded front perspective view of the cross-sectional charge valve assembly of FIG. 1.

FIGS. 1-2 illustrate a charge valve assembly 10 in operational relationship with an air conditioning system component 12 of an air condition system of a motor vehicle according to the present disclosure. The charge valve assembly 10 is configured to permit a servicing of the air conditioning system. The air conditioning system component 12 is configured to convey a fluid such as refrigerant and is generally shown in the figures as a tubing of the air conditioning system. However, it is understood the air conditioning system component 12 can be a hose, condenser, evaporator, accumulator, compressor, or any other component commonly employed with the air conditioning system. Additionally, it is understood the charge valve assembly 10 can be employed with other systems outside of the air conditioning system of the motor vehicle without departing from the scope of the instant disclosure. As a non-limiting examples, the charge valve assembly 10 can be employed in domestic and commercial refrigeration systems and in high pressure gas or refrigerant systems used in the medical and food and beverage industries.

The charge valve assembly 10 includes a valve housing 14. The valve housing 14 is a generally tubular housing body and has a first end 16, a second end 18, and an inner surface 20 defining a cavity 22. The cavity 22 extends from the first end 16 to the second end 18 of the valve housing 14. The inner surface 20 of the valve housing 14 has a first threaded portion 24, a second threaded portion 26, and a third threaded portion 28 formed thereon. The first threaded portion 24 is formed at a distance from the first end 16 of the valve housing 14 and the third threaded portion 28 is formed at a distance from the second end 18 of the valve housing 14. The second threaded portion 26 is formed intermediate the first threaded portion 24 and the third threaded portion 28. A seating surface 30 is formed on the inner surface 20 of the valve housing 14 intermediate the first threaded portion 24 and the second threaded portion 26. A diameter of the cavity 22 gradually increases from the seating surface 30 to the second end 18 of the valve housing 14 to accommodate receiving a valve core assembly 32 and a base 70.

The valve core assembly 32 is received through the valve housing 14 from the second end 18 of the valve housing 14 in a direction indicated by the arrow in FIG. 2. The valve core assembly 32 includes a core housing 34. A first end 36 of the core housing 34 is positioned towards the first end 16 of the valve housing 14 and a second end 38 of the core housing 34 is positioned towards the second end 18 of the valve housing 14. External threads 40 are formed on the core housing 34 adjacent the second end 38 of the core housing 34. The external threads 40 engage the second threaded portion 26 of the valve housing 14 until a seating surface 42 formed proximate the first end 36 of the core housing 34 engages the seating surface 30 of the valve housing 14. The seating surface 30 of the valve housing 14 is configured as a stop to prevent the valve core assembly 32 from moving beyond the stop in a direction towards the first end 16 of the valve housing 14. The seating surface 30 of the valve housing 14 cooperates with the seating surface 42 of the core housing 34 to form a seal between the valve housing 14 and the valve core assembly 32 which will be further described herein below.

A first seal 44 is received in a circumferential recess 46 formed below and axially proximate the seating surface 42 of the core housing 34. As shown, the first seal 44 is an o-ring type seal. However, it is understood that other seal types can be used as desired. The first seal 44 compresses between the recess 46 and the inner surface 20 of the valve housing 14 to facilitate a seal therebetween. The first seal 44 is typically produced from an elastomeric material configured to conform and seal quickly upon engagement of the core housing 34 with the valve housing 14. Although, it is understood alternate materials with desirable properties could be employed. The first seal 44 cooperates with the seal formed by the seating surface 30 of the valve housing 14 and the seating surface 42 of the core housing 34 to form a more robust seal between the valve core assembly 32 and the inner surface 20 of the valve housing 14.

A pin 48 is slideably received in a flow channel 50 axially formed in the core housing 34. The flow channel 50 is in fluid communication with the cavity 22 of the valve housing 14. The pin 48 includes a primary seal 52 formed at a lower end of the pin 48. The primary seal 52 is substantially conical in shape and is selectively moved from a closed position to an open position to open and close the flow channel 50 at the second end 38 of the core housing 34. In the closed position, a sealing face 54 of the primary seal 52 engages an inner sealing surface 56 of the core housing 34 formed adjacent the second end 38 of the core housing 34 to form a seal to close the flow channel 50.

A second seal 58 is received in a circumferential recess 60 formed in the primary seal 52 of the pin 48. As shown, the second seal 58 is an o-ring type seal. However, it is understood that other seal types can be used as desired. The second seal 58 compresses between the recess 60 and an inner surface of the core housing 34 to facilitate a seal therebetween when the pin 48 is in the closed position. The second seal 58 is typically produced from an elastomeric material configured to conform and seal quickly upon engagement of the primary seal 52 with the inner sealing surface 5 of the core housing 34. Although alternate materials with desirable properties could be employed. The second seal 58 cooperates with the seal formed by engagement of the inner sealing surface 56 of the core housing 34 with the sealing face 54 of the primary seal 52 to form a more robust seal between the primary seal 52 and the inner surface of the core housing 34 when the pin 48 is in the closed position.

The pin 48 extends axially outwardly through the first end 36 of the core housing 34 and through a bridge 64 of the core housing 34. The retention head 62 is formed at a distal end of the pin 48. The retention head 62 is disposed outside of the valve core housing 34 at a distance from the first end 36 of the core housing 34 and from the bridge 64 of the core housing 34. A spring 66 is seated on the bridge 64 and extends between the bridge 64 and the retention head 62. The spring 66 urges the retention head 62 towards the first end 16 of the valve housing 14 to maintain the pin 48 in the closed position.

Figure 3:
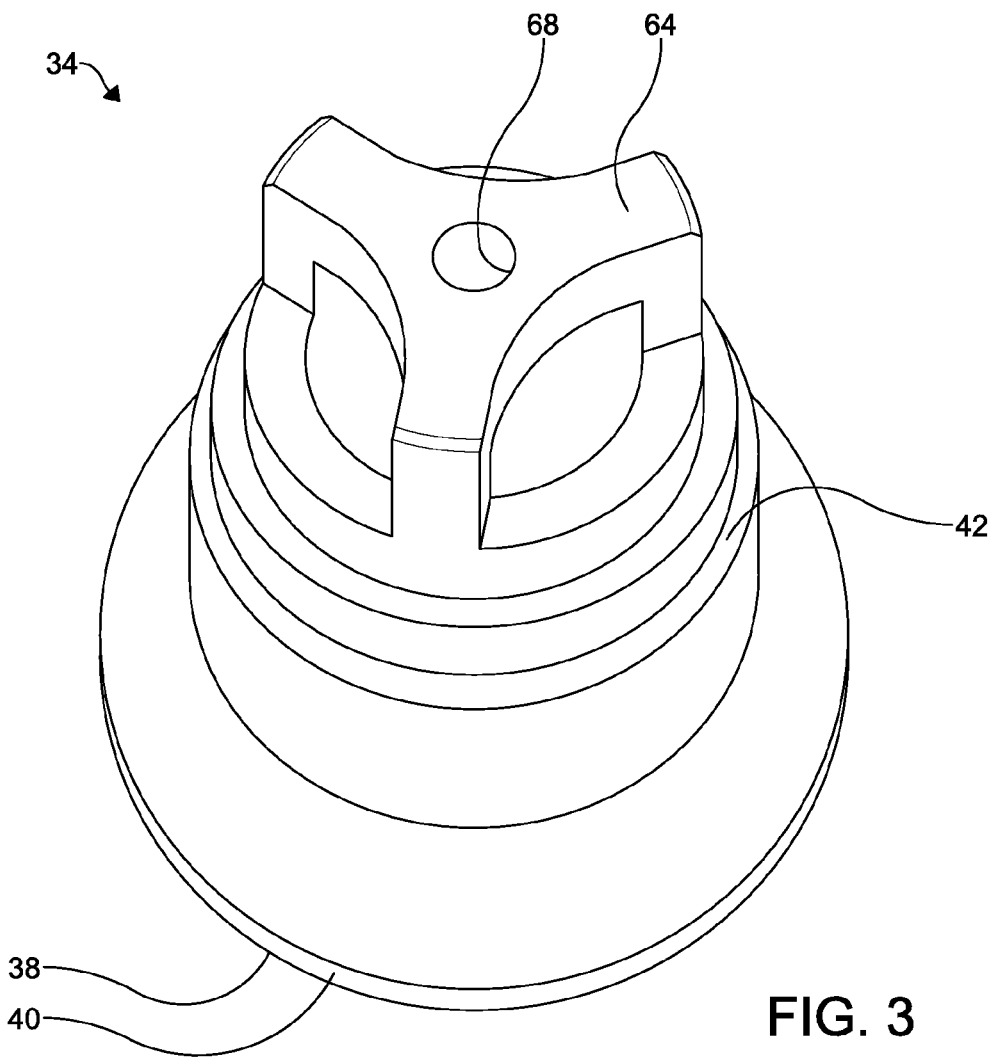
FIG. 3 is a top perspective view of a core housing of the charge valve assembly of FIGS. 1-2.

As shown in FIG. 3, the bridge 64 has a substantially trilobular shape with an axially aligned aperture 68 formed therethrough for receiving the pin 48. The trilobular shape of the bridge 64 militates against a standard charge valve tool (not shown) being employed to remove the valve core assembly 32 from the valve housing 14. Additionally, the trilobular shape of the bridge 64 differs in shape from the shapes of bridges commonly employed with charge valve assemblies. Accordingly, in application, the trilobular shape of the bridge 64 serves as a visual indicator to a technician that the valve core assembly 32 is not permitted for removal through the first end 16 of the valve housing 14. However, other shapes of the bridge can be employed as a visual indicator such as square, ovular, star, multi-lobular, cruciform, or any other shape as desired.

With renewed reference to FIGS. 1-2, the charge valve assembly 10 further includes a base 70. The base 70 includes a first end 72, a second end 74, and a flow passage 76 extending from the first end 72 to the second end 74 thereof. External threads 78 are formed on an outer surface of the base 70. The base 70 is received in the cavity 22 of the valve housing 14 to align the flow passage 76 thereof and provide fluid communication with the flow channel 50 of the valve core assembly 32. The primary seal 52 extends into a portion of the flow passage 76 when the pin 48 is in the open position. The external threads 78 of the base 70 engage the third threaded portion 28 of the valve housing 14 to position the first end 72 of the base 70 in engagement with the second end 38 of the core housing 34. The engagement of the first end 72 of the base 70 with the second end 38 of the core housing 34 forms a seal between the base 70 and the core housing 34 which will be further described herein below. A flanged surface 80 extending outwardly from the outer surface of the base 70 is positioned adjacent the second end 18 of the valve housing 14. A tolerance gap (not shown) may be formed intermediate the flanged surface 80 and the second end 18 of the valve housing 14 to accommodate for dimensional variations created during the manufacturing of the valve housing 14, the valve core assembly 32, and the base 70.

The second end 74 of the base 70 is configured for coupling to the air conditioning system component 12. If desired, the second end 74 of the base 70 can be coupled to the air conditioning system component 12 by a brazing process, for example. However, other processes known for coupling charge valve assemblies to air conditioning components can be employed such a press-fitting or other processes now known or later developed. The flow passage 76 of the base 70 is configured to receive the refrigerant from the air conditioning system component 12.

A third seal 82 is received in a circumferential recess 84 formed in the outer surface of the base 70. As shown, the third seal 82 is an o-ring type seal. However, it is understood that other seal types can be used as desired. The recess 84 is formed intermediate the first end 72 of the base 70 and the external threads 78 of the base 70. The third seal 82 compresses between the recess 84 and the inner surface 20 of the valve housing 14 to facilitate a seal therebetween. As shown, the third seal 82 is produced from an elastomeric material configured to conform and seal quickly upon engaging the base 70 with the valve housing 14. Although alternate materials with desirable properties could be employed. The third seal 82 is configured as an environmental seal to militate against permeation of elements from the environment external to the charge valve assembly 10 through a portion of the charge valve assembly 10 proximate the first end 72 of the base 70 and the second end 38 of the core housing 34.

Figure 4:
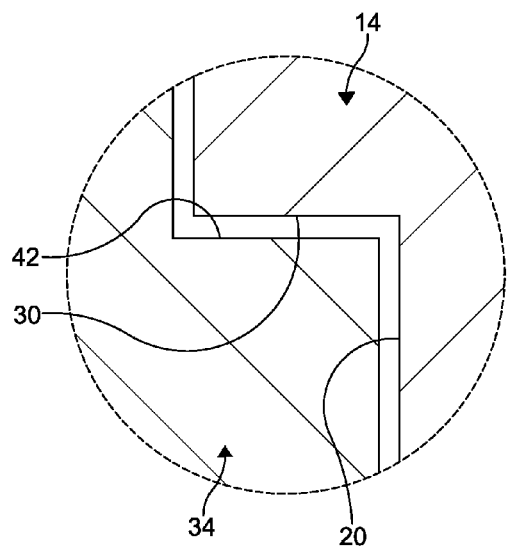
FIG. 4 is an enlarged fragmentary cross-sectional elevational view of the charge valve assembly highlighted by circle 4 in FIG. 1, showing a cross-sectional surface profile of a seating surface of a valve housing of the charge valve assembly.
Figure 5A:
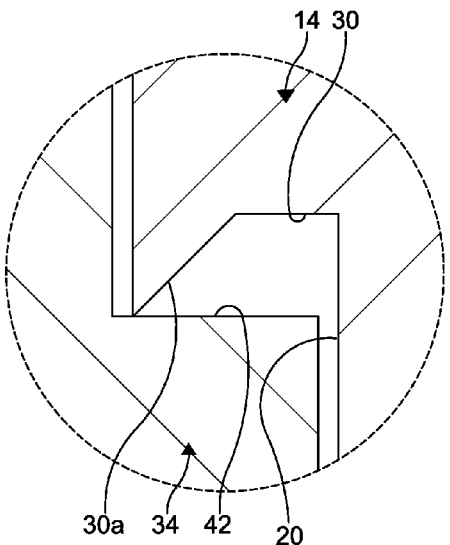
FIGS. 5A-5C are enlarged fragmentary cross-sectional elevational views similar to FIG. 4, showing alternate embodiments of a cross-sectional surface profile of the seating surface of the valve housing of the charge valve assembly.
Figure 5B:
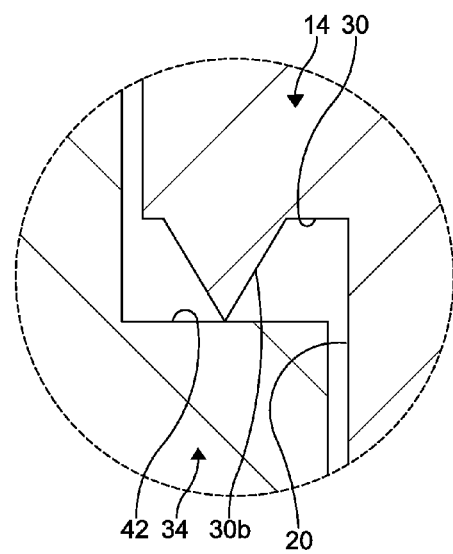
Figure 5C:
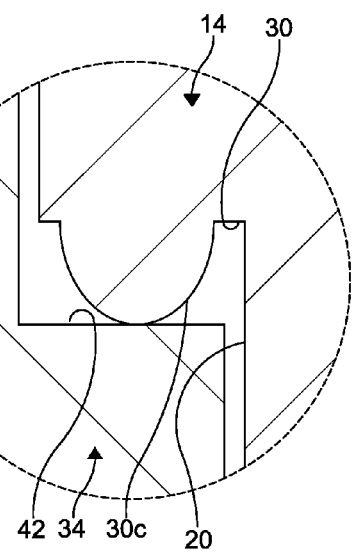

FIG. 4 illustrates the seating surface 30 of the valve housing 14 engaging the seating surface 42 of the core housing 34 to form the seal therebetween. As shown, the seating surface 30 of the valve housing 14 has a substantially linear cross-sectional profile. However, the sealing can be realized with the various cross-sectional profiles shown in the exemplary alternate embodiments illustrated in FIGS. 5A-5C. In FIG. 5A, the cross-sectional profile of the seating surface 30 can include a substantially triangular protuberance 30a extending therefrom. The triangular protuberance 30a is a substantially right angled triangle formed in a portion of the seating surface 30 adjacent the valve core assembly 32. However, in another embodiment illustrated in FIG. 5B, the triangular protuberance 30b is a substantially isosceles triangle centrally formed on the seating surface 30. In FIG. 5C, a centrally convex protuberance 30c with respect to the seating surface 30 is formed on the seating surface 30. The protuberances 30a, 30b, 30c effect improved sealing due to contact stress created between the seating surface 30 of the valve housing 14 and the seating surface 42 of the core housing 34 upon engagement thereof. It is understood other cross-sectional surface profiles can be contemplated to effect improved sealing between the seating surface 30 of the valve housing 14 and the seating surface 42 of the core housing 34. For example, instead of the seating surface 30 of the valve housing 14 including the protuberances 30a, 30b, 30c, the seating surface 42 of the core housing 34 can include protuberances formed thereon similar to the protuberances 30a, 30b, 30c formed on the seating surface 30 of the valve housing 14.

Figure 6:
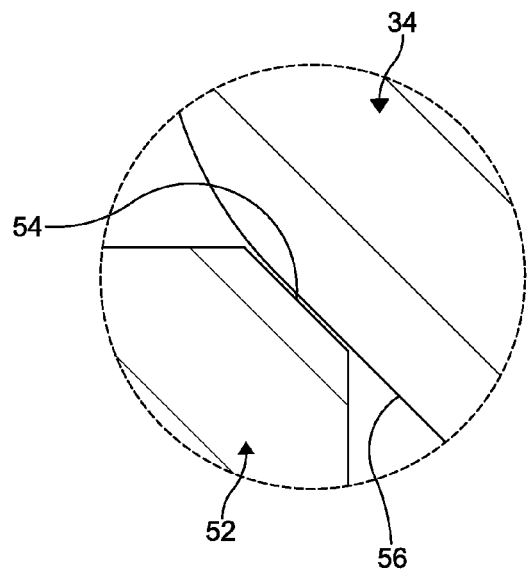
FIG. 6 is an enlarged fragmentary cross-sectional elevational view of the charge valve assembly highlighted by circle 6 in FIG. 1, showing a cross-sectional surface profile of an inner sealing surface of a core housing of the charge valve assembly.
Figure 7A:
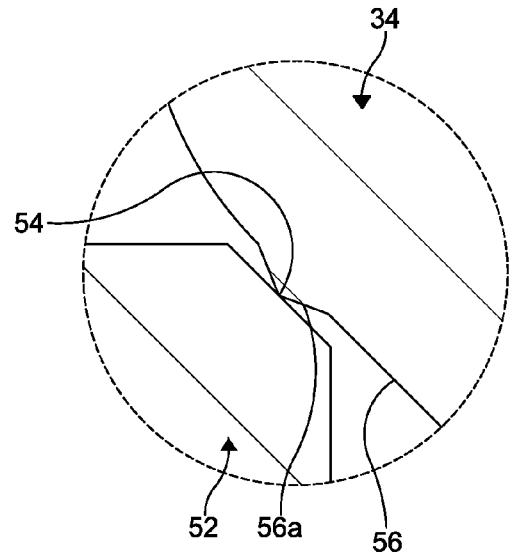
FIGS. 7A-7B are enlarged fragmentary cross-sectional elevational views similar to FIG. 6, showing alternate embodiments of a cross-sectional surface profile of the inner sealing surface of the core housing of the charge valve assembly.
Figure 7B:
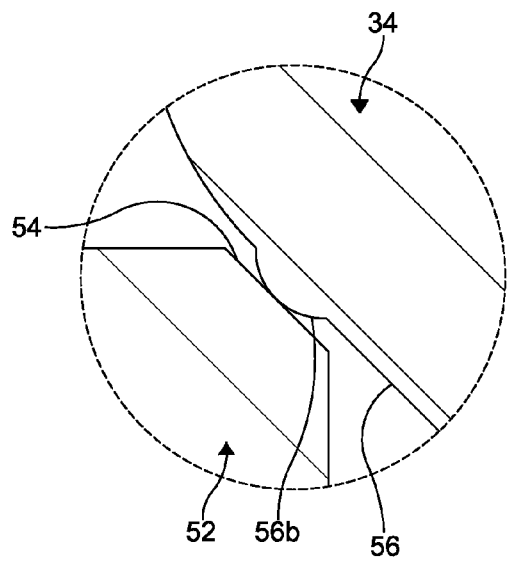

FIG. 6 illustrates the primary seal 52 of the pin 48 engaging with the inner sealing surface 56 of the core housing 34 to form the seal therebetween. As shown, the inner sealing surface 56 of the core housing 34 has a substantially linear cross-sectional profile. However, the sealing can be realized with the various cross-sectional profiles shown in the exemplary embodiments illustrated in FIGS. 7A-7B. In FIG. 7A, the inner sealing surface 56 of the core housing 34 can include a protuberance 56a extending therefrom. The protuberance 56a has a triangular cross-sectional profile. However, in another exemplary embodiment illustrated in FIG. 7B, a protuberance 56b has a centrally convex profile with respect to the inner sealing surface 56 of the core housing 34. The protuberances 56a, 56b effect improved sealing due to contact stress created between the inner sealing surface 56 of the core housing 34 and the primary seal 52 of the pin 48 upon engagement thereof in the closed position of the pin 48. It is understood other cross-sectional surface profiles can be contemplated to effect an improved sealing between the inner sealing surface 56 of the core housing 34 and the primary seal 52 of the pin 48. For example, instead of the inner sealing surface 56 of the core housing 34 including the protuberances 56a, 56b, the primary seal 52 of the pin 48 can include protuberances formed thereon similar to the protuberances 56a, 56b formed on the inner sealing surface 56 of the core housing 34.

Figure 8:
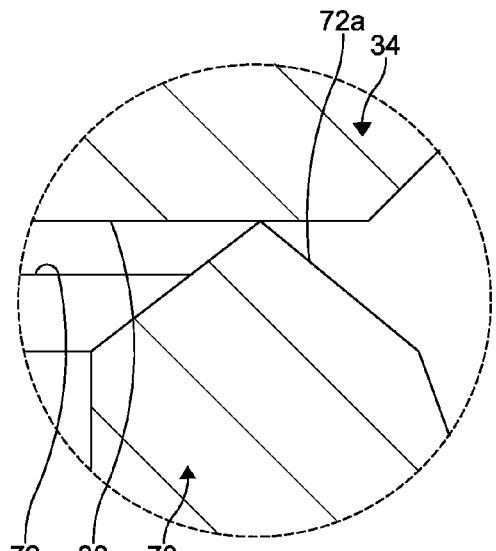
FIG. 8 is an enlarged fragmentary cross-sectional elevational view of the charge valve assembly highlighted by circle 8 in FIG. 1, showing a cross-sectional surface profile of a first end of a base of the charge valve assembly and a second end of a valve core assembly of the charge valve assembly.
Figure 9A:
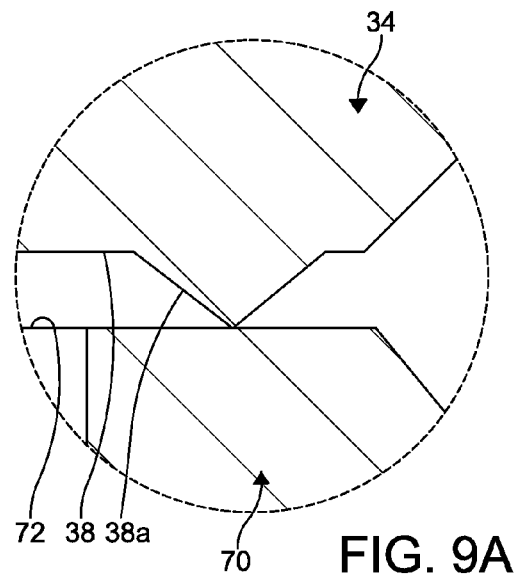
FIGS. 9A-9B are enlarged fragmentary cross-sectional elevational views similar to FIG. 8, showing alternate embodiments of a cross-sectional surface profile of the first end of the base of the charge valve assembly and the second end of the valve core assembly of the charge valve assembly.
Figure 9B:
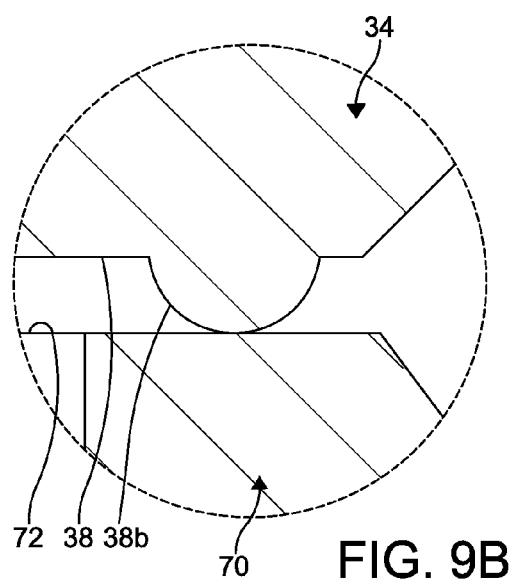

FIG. 8 illustrates the second end 38 of the core housing 34 engaging with the first end 72 of the base 70 to form the seal therebetween. As shown, the first end 72 of the base 70 has a substantially triangular protuberance 72a extending outwardly therefrom to effect improved sealing between the base 70 and the core housing 34. Alternatively, in the exemplary embodiment shown in FIG. 9A, the second end 38 of the core housing 34 includes a substantially triangular protuberance 38a extending therefrom. In FIG. 9B, a centrally convex protuberance 38b with respect to the second end 38 of the core housing 34 is formed on the second end 38 of the core housing 34. It is understood that a centrally convex protuberance can be formed on the first end 72 of the base 70, if desired. The protuberances 72a, 38a, 38b effect improved sealing due to contact stress created between the core housing 34 and the base 70 upon engagement thereof. It is also understood, each of first end 72 of the base 70 and the second end 38 of the core housing 34 can be substantially planar. Additionally, other cross-sectional surface profiles can be contemplated, as desired, to effect improved sealing between the core housing 34 and the base 70.

In order to form an improved seal between the seating surface 30 of the valve housing 14 and the seating surface 42 of the core housing 34, between the inner sealing surface 56 of the core housing 34 and the primary seal 52 of the pin 48, between the second end 38 of the core housing 34 and first end 72 of the base 70, and between the external threads 40 of the core housing 34 and the second threaded portion 26 of the valve housing 14, the core housing 34 may include a coating of tin on the outer surface and the inner surface thereof. The tin coating effects enhanced sealing between the core housing 34 and the components (the valve housing 14, the pin 48, the base 70) of the charge valve assembly 10 engaging therewith. It is understood an entirety of the core housing 34 can be coated with tin or separate select portions of the core housing 34 can include individual coatings of tin such as at the seating surface 42 of the core housing 34, the inner sealing surface 56 of the core housing 34, the second end 38 of the core housing 34, and/or the external threads 40 of the core housing 34, for example. It is also understood, other soft metal or materials may be applied as coatings to the core housing 34 to effect enhances sealing such as bismuth and lead, for example.

To assemble the charge valve assembly 10, the valve core assembly 32 is preassembled with the pin 48 inserted through the core housing 34 and the spring 66 positioned intermediate the bridge 64 and the retention head 62 of the pin 48. The valve core assembly 32 is inserted into the cavity 22 of the valve housing 14 from the second end 18 or lower end of the valve housing 14, wherein the first end 36 of the core housing 34 faces the first end 16 of the valve housing 14 and the second end 38 of the core housing 34 faces the second end 18 of the valve housing 14. Desirable sealing results have been found by assembling the charge valve assembly 10 in substantially the orientation shown in FIG. 1. Although, it is understood the charge valve assembly 10 could be assembled in alternate orientations. The external threads 40 of the core housing 34 engage the second threaded portion 26 of the valve housing 14. As the valve core assembly 32 is being threaded into the valve housing 14, the seating surface 30 of the valve housing 14 engages and forms the seal with the seating surface 42 of the core housing 34. The seating surface 30 is configured as a positive stop to maintain the valve core assembly 32 at a predetermined desired position within the valve housing 14. The position of the valve core assembly 32 sets a desired position of the pin 48 with respect to the valve housing 14. The position of the pin 48 with respect to the valve housing 14 can be predetermined in accordance with SAE International standards. Additionally, the first seal 44 acts as a supplementary seal to the seal formed by engagement of the seating surface 30 of the valve housing 14 and the seating surface 42 of the core housing 34 to effect a more robust seal between the valve housing 14 and the core housing 34. The positions and configurations of the external threads 40 formed adjacent the second end 38 of the core housing 34, the seating surface 30 of the valve housing 14, and the first seal 44 advantageously prevent the valve core assembly 32 from being inserted into the cavity 22 from the first end 16 of the valve housing 14. Because the external threads 40 are formed adjacent the second end 38 of the core housing 34, as the valve core assembly 32 is inserted into the cavity 22 from the first end 16 of the valve housing 14, the external threads 40 engage the valve housing 14 at a position lower or below the seal formed by the engagement of the seating surface 30 of the valve housing 14 and the seating surface 42 of the valve core assembly 32 and the seal formed by the first seal 44. Therefore, due to gravity, debris and particulates generated by the engagement of the external threads 40 of the valve core assembly 32 with the second threaded portion 26 of the valve housing 14 do not flow towards the seal formed by the engagement of the seating surface 30 of the valve housing 14 and the seating surface 42 of the valve core assembly 32 or the seal formed by the first seal 44. The debris and the particulates are advantageously prevented from compromising the seal formed between the seating surface 30 of the valve housing 14 and the seating surface 42 of the core housing 34 and the supplementary seal formed by the first seal 44.

The base 70 is separately coupled to the air conditioning system component 12 by a brazing process or another hermetic process such as welding or compression coupling, for example, prior to assembly to the charge valve assembly 10. Additionally, the base 70 can be integrally formed with the air conditioning system component 12, if desired. Once coupled to the air conditioning system component 12, the base 70 is inserted through the cavity 22 from the second end 18 of the valve housing 14. The external threads 78 of the base 70 engage the third threaded portion 28 of the valve housing 14. Upon threading, the first end 72 of the base 70 engages the second end 38 of the core housing 34 and the flanged surface 80 of the base 70 is positioned proximate or engaged with the second end 18 of the valve housing 14. Advantageously, the base 70 has the external threads 78 instead of internal threads. Undesired flux debris from the brazing process or debris from a press fitting process will flow through the flow passage 76 of the base 70 and will not contact the external threads 78. In turn, the engagement between the external threads 78 of the base 70 and the third threaded portion 28 of the valve housing 14 are not compromised. The seal formed by the engagement of the second end 38 of the core housing 34 with the first end 72 of the base 70 effects an improved sealing between the core housing 34 and the base 70 to militate against the refrigerant leaking therebetween.

Figure 10:
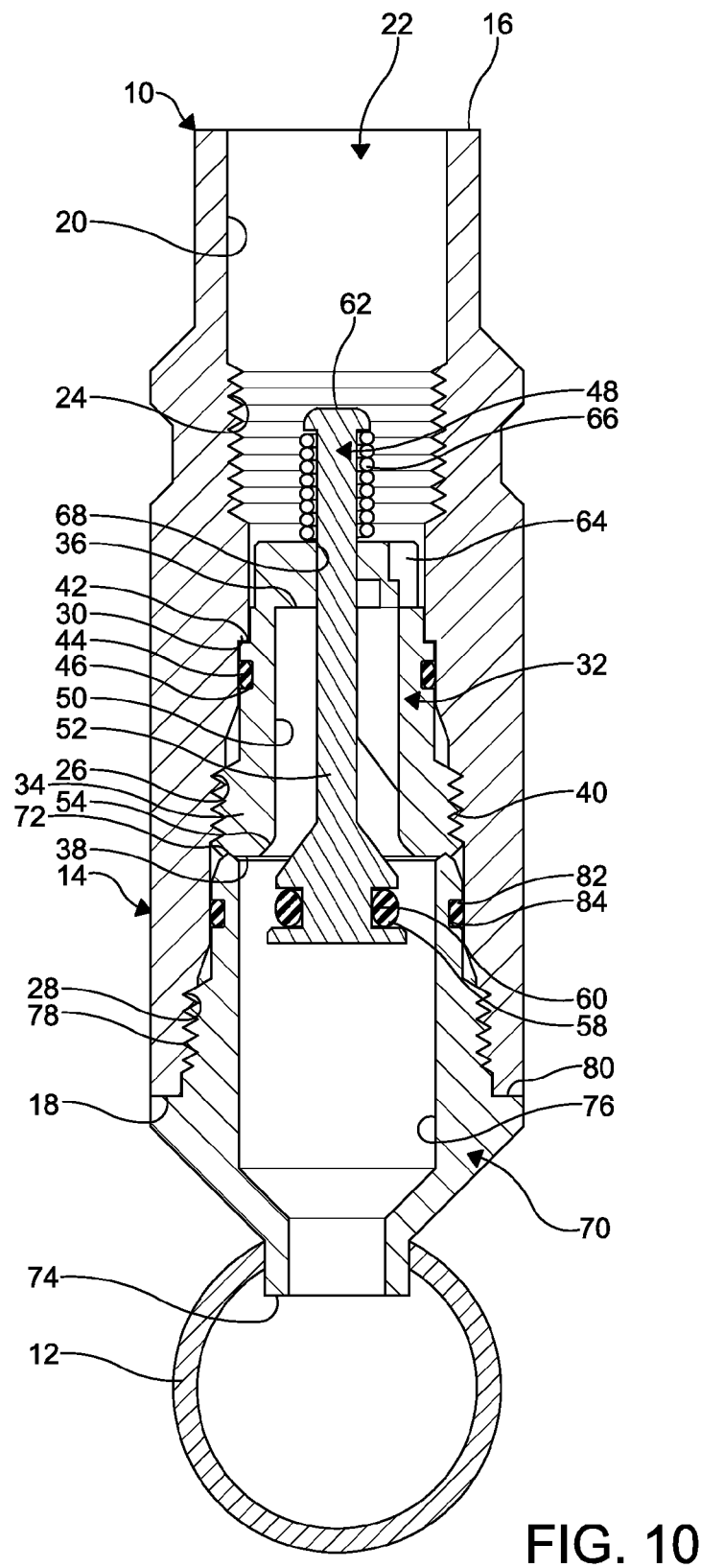
FIG. 10 is a cross-sectional front elevational view of the charge valve assembly of FIG. 1, wherein the pin of the charge valve assembly is in an open position.

Due to the biasing of the pin 48 towards the first end 16 of the valve housing 14 by the spring 66 and pressure from refrigerant in the air conditioning system component 12, the pin 48 is maintained in the closed position as illustrated in FIG. 1. Upon a servicing of the air conditioning system for testing, charging, discharging, or evacuating the refrigerant from the air conditioning system, a technician uses a service tool (not shown), which engages the retention head 62 of the pin 48. A force applied to the tool engaging the retention head 62 of the pin 48 causes the pin 48 to move downwards to the open position shown in FIG. 10, against the biasing of the spring 66 and pressure from the refrigerant. In the open position, the primary seal 52 disengages the inner sealing surface 56 of the core housing 34. Upon disengagement of the primary seal 52 from the inner sealing surface 56 of the core housing 34, the flow passage 76 of the base 70 receives the primary seal 52 to permit the refrigerant to flow through the flow passage 76 of the base 70, through the flow channel 50 of the core housing 34, and through the cavity 22 of the valve housing 14. When the charge valve assembly 10 is not being employed for servicing, a cap (not shown) can be threaded to the first threaded portion 24 to militate against exposure to the environment and to further prevent leakage of the charge valve assembly 10 and entry of debris or foreign material into the charge valve assembly 10.

The charge valve assembly 10 has many advantages as discussed hereinabove. Mainly, the configuration of the charge valve assembly 10 includes improved sealing, particularly between the valve housing 14 and the valve core assembly 32, between the primary seal 52 of the pin 48 and the core housing 34, between the valve core assembly 32 and the base 70, and between the base 70 and the valve housing 14 over charge valve assemblies of the prior art. The charge valve assembly 10 militates against debris compromising effectual sealing within the charge valve assembly 10. Specifically, compromised sealing due to fluxing debris from the brazing process coupling the charge valve assembly 10 to the air conditioning system component 12 and debris from threading of the valve core assembly 32 and/or the base 70 to the valve housing 14 is militated against.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A charge valve assembly for an air conditioning system comprising:

a valve housing having a first end, a second end, and an inner surface defining a cavity, the cavity extending from the first end of the valve housing to the second end of the valve housing, wherein the valve housing has a first threaded portion, a second threaded portion, and a third threaded portion formed on the inner surface thereof, the second threaded portion intermediate the first threaded portion and the third threaded portion;

a valve core assembly received in the cavity of the valve housing through the second end of the valve housing, the valve core assembly having a first end, a second end, a flow channel extending therethrough, an inner sealing surface, and a pin slideably received in the flow channel, the pin slideable between an open position and a closed position, the pin having a primary seal selectively engaging the inner sealing surface of the valve core assembly and closing the flow channel at the second end of the valve core assembly when in the closed position, the pin biasing towards the first end of the valve housing to the closed position, wherein external threads formed on the valve core assembly engage the second threaded portion of the valve housing; and a base including a first end, a second end, a flow passage extending from the first end to the second end thereof, and external threads formed thereon, the external threads of the base engaging the third threaded portion of the valve housing, the first end of the base engaging the second end of the valve core assembly to form a seal therebetween.

2. The charge valve assembly of claim 1, wherein the valve core assembly further comprises
a seating surface formed proximate the first end of the valve core assembly,
wherein the external threads formed on the valve core assembly are disposed adjacent the second end of the valve core assembly.

3. The charge valve assembly of claim 2, wherein a recess is formed in the valve core assembly intermediate the seating surface and the external threads, the recess configured to receive a seal.

4. The charge valve assembly of claim 2, wherein a recess is formed in the primary seal, the recess configured to receive a seal.

5. The charge valve assembly of claim 2, wherein the primary seal includes a sealing face engaging the inner sealing surface of the valve core assembly.

6. The charge valve assembly of claim 5, wherein one of the sealing face and the inner sealing surface of the valve core assembly includes a protuberance formed thereon.

7. The charge valve assembly of claim 2, wherein at least a portion of the valve core assembly includes a tin coating.

8. The charge valve assembly of claim 2, wherein the valve core assembly includes a bridge extending outwardly from the first end, the bridge having a trilobular shape.

9. The charge valve assembly of claim 1, wherein
the first threaded portion is configured to engage a cap of the charge valve assembly, and
wherein a seating surface is formed on the inner surface intermediate the first threaded portion and the second threaded portion.

10. The charge valve assembly of claim 9, wherein the seating surface has a protuberance formed thereon.

11. The charge valve assembly of claim 9, wherein a diameter of the cavity increases from the seating surface to the second end.

12. The charge valve assembly of claim 1, wherein one of the first end of the base and the second end of the valve core assembly includes a protuberance formed thereon.

13. The charge valve assembly of claim 1, further comprising at least one of an o-ring seal disposed intermediate the valve housing and the valve core assembly, an o-ring seal disposed intermediate the pin and the valve core assembly, and an o-ring seal disposed intermediate the base and the valve housing.

14. The charge valve assembly of claim 1, wherein the valve housing has a seating surface formed on the inner surface thereof and the valve core assembly has a seating surface formed thereon, the seating surface of the valve core assembly engaging the seating surface of the valve housing to form a seal between the valve core assembly and the valve housing.

15. The charge valve assembly of claim 14, wherein one of the seating surface of the valve housing and the seating surface of the valve core assembly includes a protuberance formed thereon.

16. The charge valve assembly of claim 1, wherein one of the inner sealing surface of the valve core assembly and the primary seal includes a protuberance formed thereon.

17. The charge valve assembly of claim 1, wherein at least a portion of the valve core assembly includes a tin coating.

* * * * *

UNITED STATES PATENT AND TRADEMARK OFFICE
CERTIFICATE OF CORRECTION

| | | |
|---|---|---|
| PATENT NO. | : 9,969,242 B2 | Page 1 of 1 |
| APPLICATION NO. | : 15/190266 | |
| DATED | : May 15, 2018 | |
| INVENTOR(S) | : Eric Kesler and Steve White | |

It is certified that error appears in the above-identified patent and that said Letters Patent is hereby corrected as shown below:

On the Title Page

Item (72) please update inventor Steve White's city from Pickney to Pinckney.

Signed and Sealed this
Third Day of July, 2018

Andrei Iancu
*Director of the United States Patent and Trademark Office*